(12) United States Patent
Foster

(10) Patent No.: US 11,476,731 B2
(45) Date of Patent: Oct. 18, 2022

(54) ELECTROMOTIVE MACHINE

(71) Applicant: LIM-Tech Limited, Shepshed (GB)

(72) Inventor: Alan Foster, Leicestershire (GB)

(73) Assignee: LIM-TECH LIMITED, Shepshed (GB)

( * ) Notice: Subject to any disclaimer, the term of this patent is extended or adjusted under 35 U.S.C. 154(b) by 236 days.

(21) Appl. No.: 16/834,096

(22) Filed: Mar. 30, 2020

(65) Prior Publication Data

US 2020/0313487 A1    Oct. 1, 2020

(30) Foreign Application Priority Data

Apr. 1, 2019  (EP) ..................................... 19166499

(51) Int. Cl.
| | |
|---|---|
| H02K 3/24 | (2006.01) |
| H02K 3/12 | (2006.01) |
| H02K 3/30 | (2006.01) |
| H02K 3/34 | (2006.01) |
| H02K 9/22 | (2006.01) |

(52) U.S. Cl.
CPC .................. *H02K 3/24* (2013.01); *H02K 3/12* (2013.01); *H02K 3/30* (2013.01); *H02K 3/345* (2013.01); *H02K 9/22* (2013.01)

(58) Field of Classification Search
CPC .. H02K 3/12; H02K 3/24; H02K 3/30; H02K 3/32; H02K 3/34; H02K 3/345; H02K 9/22
USPC ............................... 310/12.14, 24, 25, 64, 89
See application file for complete search history.

(56) References Cited

U.S. PATENT DOCUMENTS

| | | | |
|---|---|---|---|
| 5,334,899 | A | 8/1994 | Skybyk |
| 5,586,505 | A | 12/1996 | Berdut |
| 6,977,451 | B2 | 12/2005 | Onishi |
| 7,732,951 | B2 | 6/2010 | Mukaide |
| 8,110,950 | B2 | 2/2012 | Moriyama et al. |
| 9,620,998 | B2 | 4/2017 | Li et al. |
| 2002/0089242 | A1 | 7/2002 | Liang et al. |

(Continued)

FOREIGN PATENT DOCUMENTS

| | | |
|---|---|---|
| CN | 201100756 | 8/2008 |
| CN | 203180745 | 9/2013 |

(Continued)

OTHER PUBLICATIONS

Macha et al., English Machine Translation of DE 1204316 (Year: 1965).*

(Continued)

*Primary Examiner* — Rashad H Johnson
(74) *Attorney, Agent, or Firm* — Hahn Loeser & Parks LLP; Daniel J. Smola

(57) ABSTRACT

An electromotive machine having a stator (122) comprising a plurality of coils (120) and a plate (10) is disclosed. The plate (10) has a plurality of through slots (15) formed therein. A portion of the plate (10) faces a corresponding coil (120) and is located relative to the coil (120) such that, in use, heat from the coil (120) flows into said portion. A transportation system (91) including such an electromotive machine is also disclosed. Also disclosed is a coil (20) for an electromotive machine comprising a conductor being wound in a plurality of turns and having two ends (25, 35) located on the outside of the coil (20).

20 Claims, 13 Drawing Sheets

(56) References Cited

U.S. PATENT DOCUMENTS

| | | | |
|---|---|---|---|
| 2003/0071532 A1 | 4/2003 | Post | |
| 2003/0111029 A1 | 6/2003 | Grundl et al. | |
| 2004/0123766 A1 | 7/2004 | van den Bergh et al. | |
| 2005/0225192 A1 | 10/2005 | Kloepzig et al. | |
| 2005/0231057 A1 | 10/2005 | Kloepzig et al. | |
| 2007/0152513 A1* | 7/2007 | Shikayama | H02K 41/03 310/12.25 |
| 2008/0062648 A1 | 3/2008 | Gilliland | |
| 2008/0231131 A1* | 9/2008 | Gabrys | H02K 3/47 310/195 |
| 2008/0284259 A1 | 11/2008 | Grundl et al. | |
| 2009/0243424 A1* | 10/2009 | Watanabe | H02K 3/47 310/216.109 |
| 2011/0037333 A1 | 2/2011 | Atallah et al. | |
| 2011/0306467 A1* | 12/2011 | Massa | H02K 41/031 318/135 |
| 2013/0062990 A1* | 3/2013 | Takeuchi | B62M 6/40 310/216.004 |
| 2013/0082147 A1 | 4/2013 | De Castro et al. | |
| 2013/0334901 A1 | 12/2013 | Stadnik | |
| 2014/0132088 A1 | 5/2014 | Morel | |
| 2014/0232210 A1 | 8/2014 | Safaee | |
| 2014/0265662 A1 | 9/2014 | Shoykhet | |
| 2015/0084446 A1* | 3/2015 | Atar | H02K 11/33 310/43 |
| 2015/0084448 A1* | 3/2015 | Nonaka | H02K 15/06 310/43 |
| 2015/0137624 A1 | 5/2015 | Wu et al. | |
| 2015/0303841 A1* | 10/2015 | Suzuki | B65G 35/06 318/38 |
| 2016/0038840 A1 | 2/2016 | Vance | |
| 2016/0149472 A1 | 5/2016 | Pal | |
| 2017/0015526 A1 | 1/2017 | Fargo | |
| 2017/0025927 A1 | 1/2017 | Weerts et al. | |
| 2017/0077774 A1 | 3/2017 | Hirabayashi | |
| 2017/0141656 A1 | 5/2017 | Shirakawa | |
| 2017/0264182 A1* | 9/2017 | Ragan | H02K 11/0094 |
| 2018/0323685 A1 | 11/2018 | Blum et al. | |
| 2018/0337572 A1 | 11/2018 | Miyama et al. | |

FOREIGN PATENT DOCUMENTS

| | | |
|---|---|---|
| CN | 203511644 | 4/2014 |
| CN | 204156632 | 2/2015 |
| CN | 108418388 | 8/2018 |
| DE | 1204316 | 11/1965 |
| DE | 9214383 | 2/1994 |
| DE | 29705501 | 7/1998 |
| DE | 29705615 | 7/1998 |
| DE | 20016641 | 2/2002 |
| DE | 20302710 | 7/2004 |
| DE | 102006023493 | 11/2007 |
| DE | 102007058821 | 6/2009 |
| EP | 0612446 | 8/1994 |
| EP | 0754366 | 1/1997 |
| EP | 1028866 | 8/2000 |
| EP | 1728309 | 12/2006 |
| EP | 1927180 | 6/2008 |
| EP | 2074691 | 7/2009 |
| JP | 61042264 | 9/1987 |
| JP | 62281754 | 5/1989 |
| JP | 2005137151 | 5/2005 |
| WO | 2004075380 | 9/2004 |
| WO | 2008044020 | 4/2008 |
| WO | 2015072328 | 5/2015 |

OTHER PUBLICATIONS

Shen et al., English Machine Translation of CN 203511644 (Year: 2014).*

Kou et al., English Machine Translation of CN 108418388A (Year: 2018).*

ParvezIqbal et al., "A Review of Permanent Magnet Linear Motor with Halbach Array," Journal of Engineering and Applied Sciences 11 (8), 1752-1761, 2016.

Tavana et al., "Modeling and Design Optimization of Permanent Magnet Linear Synchronous Motor with Halbach Array," Proceedings of ICEE2009, Iran University of Science and Technology, Power—Electric Machines and Power Electronics, vol. 3, May 12-14, 2019.

Colyer et al., "Modular Airgap Winding for Linear Permanent Magnet Machines," IET Electr. Power Appl., vol. 12, Issue 7, 953-961, 2018.

Eastham et al., "Application of Planar Modular Windings to Linear Induction Motors by Harmonic Cancellation," IET Elctr. Power Appl., vol. 4, Issue 3, 140-148, 2010.

Zhang et al., "Investigation of an Ironless Permanent Magnet Linear Synchronous Motor with Cooling System," Appl Sci., vol. 4, 422, 2016.

EP 19 16 6500 Extended European Search Report, 52 pages; dated Oct. 4, 2019.

EP 19 16 6499 Extended European Search Report, 12 pages; dated Oct. 9, 2019.

Non-Final Office Action issued by USPTO in U.S. Appl. No. 16/371,351 dated Nov. 10, 2020.

* cited by examiner

ELECTROMOTIVE MACHINE

FIELD OF THE INVENTION

The present invention concerns electromotive machines. More particularly, but not exclusively, this invention concerns an electromotive machine comprising a heat dissipation plate. The invention also concerns a method of thermally regulating such an electromotive machine.

BACKGROUND OF THE INVENTION

As is well known, when an electric motor is driven by an external means, so that the motor's rotor is moved sufficiently quickly relative to its stator, the motor will normally act as a generator of electricity. Equivalently, when sufficient current is supplied to a generator, its rotor will normally move relative to its stator, and the generator will act as a motor. In view of that interchangeability of function, the term "electromotive machine" is used for convenience herein, to refer interchangeably to motors and/or generators.

The most well-known construction of electromotive machine comprises a moveable rotor, which rotates inside a fixed, substantially cylindrical stator. The term "rotor" is used herein to describe the passive (not energized) part of the electromotive machine that is moved, by the electromagnetic field of a motor, or to induce current in a generator. In some electromotive machines, the rotor does not rotate but is, for example, translated linearly. The stator is the active (energized) part of the machine that generates the driving electromagnetic field in a motor, or in which current is induced in a generator. It should be understood that these effects are caused by the relative motion between the stator and the rotor, and in practice either one could be actually stationary.

The stator usually comprises a long length of insulated conductor, wound repeatedly to form a "primary winding". The winding is usually wound onto a ferrous core, for example a laminated steel core, although a non-ferrous core, for example an air core, may also be used. A plurality of primary windings may be present in the stator.

The term "coil" is used to refer to a wound conductor arranged in a stator, with a leading coil side and a trailing coil side. The terms "winding" and "windings" are used to refer to a set of coils; the term is often qualified: for example, "phase winding" means all of the coils connected to one phase.

Electromotive machines can be classified in a number of different ways. One way is by the shape of the stator: it may, for example, be planar (in a linear machine), or a cylindrical tube or a disk (in a rotary machine). Linear machines are used in a wide variety of machines, for example in fairground rides, in baggage-handling machines, in urban transport (e.g. monorail) vehicles and in various other launch applications.

Another classification approach is by whether the stator is single or double, that is whether there is a stator on one side of the rotor or on two opposite sides.

Another way of classifying a machine is by the form of its rotor (this is probably the most common approach to classification). There are essentially three broad classes of rotor: rotors comprising a permanent magnet, rotors comprising conductors and rotors with variable magnetic reluctance paths wherein the saliency provides rotary force. The first are found in synchronous electromotive machines, the second especially in induction electromotive machines and the third may be found in reluctance machines. Wound rotors are also commonly found in synchronous machines: turbo-alternators and machines larger than a few kilowatts generally have wound rotors. The rotor (excitation) winding in a wound rotor synchronous machine is supplied with D.C. current to produce the same sort of field (which is stationary with respect to the rotor) as a permanent magnet array.

There are two main forms of (primary) windings in use in stators in small and medium-size machines. The first is double-layer windings, which are employed in induction motors and in some motors with permanent magnet excitation; those machines find use in general industrial applications. The second form of windings is concentrated windings, which are in general used only for motors with permanent magnet excitation; those machines are used for both general industrial applications and (notably) in computer hard-disk drives.

Double layer windings are typically wound with the leading side of the coils occupying the top half of a slot and the trailing side occupying the bottom half of a slot one coil pitch away from the leading side. Each coil is seated on top of coils on one side and is seated underneath coils on the other side.

In concentrated windings the coils are arranged adjacent to neighbouring coils and do not overlap (in the same layer). Coils of concentrated windings may all lay in the same plane in a single layer, or lay in parallel planes in multiple layers. A stator comprising concentrated windings is defined (as used herein) as a stator comprising a plurality of coils each arranged adjacent to, but not overlapping with, at least one other coil of the plurality. Other types of winding include distributed windings and modular windings, described in more detail by Wang et al, 'Comparative Study of 3-Phase Permanent Magnet Brushless Machines with Concentrated, Distributed and Modular Windings', IET Power Electronics, Machines and Drives, Dublin, Ireland, March 2006, pp. 489-493.

The current carrying conductors that form the winding coils have an innate resistance to the flow of electrical current. The flow of electrical current through a resistance results in the loss of energy in the form of heat in a process known as Ohmic heating (also known as Joule heating or resistive heating). The losses are equal to the product of the square of the current flowing though the conductor and the resistance of the conductor and are commonly referred to as $I^2R$ losses, or resistive losses. When the coils of the electromotive machine are energised and current is flowing through them these resistive losses cause an increase in the temperature of the electromotive machine. Increasing the amount of current flowing through the coils, usually done when increasing the power output of the electromotive machine, increases the resistive losses and the overall temperature of the electromotive machine. The components of an electromotive machine often have an operating temperature limit above which they may become damaged or unsafe and the operating current of a machine may be restricted.

The present invention seeks to mitigate the above-mentioned problems. Alternatively or additionally, the present invention seeks to provide an improved electromotive machine.

SUMMARY OF THE INVENTION

The present invention provides, according to a first aspect, an electromotive machine comprising a stator having a plurality of coils. The electromotive machine may further comprise at least one plate. The plate may have a plurality of through slots formed therein. The plate may comprise a plurality of portions, each portion including one or more through slots, for example a plurality of through slots. Each portion of the at least one plate may face a corresponding coil and/or may be located relative to the coil such that, in use, heat from the coil flows into said portion (and therefore the plate).

Providing such a plate may allow heat to be conducted away from the coils while the presence of the slots reduces the formation of eddy currents in the plate. Increasing the rate at which heat is removed from the machine allows for an increase in the current that can be supplied to the machine, and therefore the power that can be generated by the machine.

Eddy currents are circulating electrical currents induced in a conductive material by a changing magnetic field passing through the conductive material. Sources of changing magnetic fields in an electromotive machine include the time varying fields produced by stationary electromagnetic windings and the relative motion of moving magnetic components such as rotor magnets. Eddy currents produce their own magnetic fields that oppose the change in the magnetic field that produced the eddy current. Resistive losses from the circulating currents and oppositional forces between the magnetic fields can reduce the efficiency of machines in a manner that is well known in the art.

The plate (or a portion thereof) may be said to face a coil when the surface of said plate (or portion thereof) is substantially perpendicular to the direction of the magnetic axis of the coil produced when the coil is in an energised state. The magnetic axis of the coil may be defined as the axis between the north and south poles of the magnetic field that the coil produces when energised. It will be appreciated that the magnetic axis will lie in substantially the same position irrespective of the direction in which current is flowing in the coil. The magnetic axis may be considered the same axis as that around which the coil is wound (for example the longitudinal axis of the coil). The term corresponding coil may be used to refer to the coil closest to a portion of the plate. A given portion of the plate may have more than one corresponding coil, depending on the shape and/or arrangement of the plate and/or coil.

Each through slot may comprise a hole having an elongate form when viewed in plan on the surface of the plate. The slots may extend from an edge of the plate across a portion of the surface of the plate, for example across a portion of the width and/or radius of the plate, for example towards the other edge and/or the centre of the plate. The slots may extend across the majority of the width and/or radius of the plate. The slots may extend across a portion of the surface of the plate without reaching an edge of the plate and/or the other edge of the plate.

The slots, for example the sides of each slot, may be parallel and/or non-parallel. The width of each slot may be constant or vary along its length (e.g. the distance by which it extends across the plate). The sides of each protrusion may be parallel or non-parallel. The width of each protrusion may be constant or vary along its length. It will be appreciated that, for example in a rectangular plate, when one of the slots or protrusions are of constant width, the other of the slots or protrusions may have constant width. However, in a disc shaped plate, for one of the slots or protrusions to have a constant width, the width of the other of the slots or protrusions may need to vary. The slots may extend in a direction perpendicular to an edge of the plate, for example the edge from which they extend. The slots may extend at an acute angle to an edge of the plate, for example the edge from which they extend. Each slot may be non-parallel to another of the slots.

The slots may be spaced apart along the length of the (edge of the) plate. Thus, in the case that the slots extend from the edge of the plate, the plate between the slots may form a series of thin protrusions in a comb like structure. These thin discontinuous protrusions limit the space available for eddy currents to circulate when the plate is exposed to a changing magnetic field such as that from the magnetic field of the rotor and prevent the plate being heated by resistive losses. The slots may have a width of less than 5 mm, for example less than 3 mm. The protrusions may have a width of less than 10 mm, for example a width of 5 mm or less. It may be that there are no voids within the plate itself. The plate, for example the majority of the volume of the plate, may be solid.

The coils of the electromotive machine may be air cored, for example wound on a non-ferrous core and/or wound without a solid core in the centre of the coils. Thus, it may be that the plate does not form part of the core of the coils. The windings may be prefabricated before being installed into the electromotive machine.

It will be appreciated that the plate will have a length, a width and a thickness, the thickness being very much less than the length and the width. The plate may have an elongate shape, for example a rectangular shape, for example suitable for use in a linear electromotive machine. The plate may be a disc or portion thereof, for example suitable for use in a rotary (disc) electromotive machine. Additionally or alternatively, the plate may be formed into a non-planar shape, for example a cylinder or portion thereof, for example suitable for use in a rotary (cylindrical) electromotive machine.

The plate may extend in a plane parallel to the plane of the coils. The plate may be positioned adjacent, for example immediately adjacent, the coils, for example the flat faces of the coils.

The electromotive machine may be an alternating current machine. Supplying alternating current to electromotive machines allows for the creation of the changing magnetic fields that interact with other magnetic elements to create motion as is well known in the art. The electromotive machine may be wound with more than one phase of alternating current, i.e. it is a polyphase machine. The electromotive machine may be a three-phase machine. The three phases of the machine are supplied by alternating currents that are separated by 120 electrical degrees in time. When current is supplied to the windings, separated into three phases in this manner, a travelling magnetic field is produced that can be used to propel a rotor.

The electromotive machine may be a linear machine. The stator of the linear electromotive machine may comprise an elongate body. The body may be arranged in a vertical 'fin' shape. Thus, it may be that the plate is substantially planar, for example a substantially planar elongate body. It may be that the coils are arranged in a straight line, for example a straight line parallel to the plate.

The electromotive machine may comprise a rotor. A plurality of magnets (for example permanent magnets and/or electromagnets) may be mounted on the rotor. The machine may be configured such that, in use, the rotor of the linear motor may extend over the stator such that one part of the rotor is positioned on one side of the stator and another part of the rotor is positioned on an opposite side of the stator. In this arrangement the magnets of the rotor can interact with magnetic fields on both sides of the stator. Faces of the magnets from which magnetic fields emanate may face inwards toward the stator. This allows for a strong interaction between the magnetic fields of the stator and rotor.

The stator may be longer than, for example at least twice as long as, the rotor. This is a useful arrangement for generating propulsive force over a large range of motion of the rotor. Alternatively, the rotor may be longer than the stator.

It may be that the electromotive machine is a rotary machine. The stator of the machine may comprise a cylindrical body (or a portion thereof) with coils arranged around the circumference of said body. The coils may be arranged to form a cylinder (or a portion of the circumference thereof) around, for example inside, the stator. The plate may form a cylinder (or a portion of the circumference thereof). The plate and the coils of the rotary machine may be positioned concentrically. More than one plate may be used in such an arrangement. In an arrangement where more than one heat plate is used, the plates may be inside, between, outside, or any combination thereof, of the coils.

The stator of the machine may comprise a disc, with coils arranged in a ring (or portion thereof) around the circumference of said disc. The plate may be a disc (or portion thereof). More than one plate may be used in such an arrangement. In an arrangement where more than one heat plate is used, the plates may be inside, between, outside, or any combination thereof, of the coils.

The windings of the electromotive machine may comprise a first set of coils and a second set of coils. The two sets of coils may be arranged parallel to each other. The coils of the first set may be mounted on a first side of the stator and the coils of the second set may be mounted on a second side of the stator.

Providing a first set of coils and a second set of coils allows for a larger amount of force to be produced by the windings over a given length of the stator and may allow for control over the harmonic content of the overall travelling magnetic field.

The coils of each phase winding of the first side may be wound in the opposite direction to the coils of the corresponding phase winding of the second side when the two sides of the stator are arranged with their coils facing one another.

Providing two sets of windings wound in such a manner may reduce or eliminate unwanted harmonics.

The coils may form concentrated windings. This arrangement may allow for prefabrication of the coils and/or facilitate installation onto the machine. This arrangement may also allow the windings to be layered in multiple distinct layers.

The coils of the first set may be in a displaced position relative to the second set so that corresponding coils of each set are not aligned. More specifically, the windings comprising the coils of the first set may be displaced relative to the windings comprising the coils of the second set by one and a half coil pitches, where a coil pitch is the width of one coil. In this arrangement, each coil of a phase may be linearly positioned half way between two of the coils of the corresponding phase on the opposite side of the stator. In this arrangement an n-pole harmonic of the magnetic field is substantially cancelled, where n is a positive, even integer. This arrangement is described in more detail in EP 2 074 691, the contents of which is incorporated by reference herein.

The electromotive machine may comprise more than one plate, for example two or more plates. The plates may extend parallel to each other.

The machine may comprise a plurality of plates, each plate comprising a plurality of through slots. A portion of each plate may face a corresponding coil and be located such that heat from the coil may flow into said portion of the plate. Using more than one plate may increase the rate at which heat can be removed from the machine. It may be advantageous to use more than one thin plate rather than a single thicker plate to minimise the formation of eddy currents.

One or more plates, for example two plates may be located between the first set of coils and the second set of coils. Thus first and second plates may be located between the first and second sets of coils. One of the plates may face the coils of the first set and the other plate may face the coils of the second set. This may allow the plate(s) to act as a conduit through which heat is conducted away from the centre of the machine such that the machine is cooled from the inside where the highest temperatures are generated.

Alternatively, the coils of the machine may be positioned between two or more plates. This arrangement may allow the windings of the machine to be cooled from the outside rather than the inside.

Alternatively, an alternating pattern of plates and coils may be used. A plate may be positioned on either side of each set of coils. This arrangement may allow for removal of more heat from the machine than only providing plates inside or outside the windings.

Each coil may be a flat coil. That is to say, the thickness of the coil may be less than 20 mm, for example less than 15 mm, for example 12 mm. Each coil may comprise a plurality of turns of a conductor. The number of turns in each coil may be less than 30, for example less than 20, for example in the range of 8 to 20 turns. In some embodiments, the section of the conductor maybe greater than 40 $mm^2$, for example in the range of 40 to 80 $mm^2$, for example in the range of 50 to 60 $mm^2$. In such embodiments the coils may be considered to consist of a small number of turns of a thick conductor. In further embodiments, the coils may consist of a large number of thinner stranded conductors in a manner that is well known in the art. The use of such flat coils may facilitate heat dissipation via the or each plate. Each coil may have two ends on the outside of the coil, as discussed in more detail below.

The or each plate may be connected to a heat dissipation apparatus configured to disperse heat received by the at least one plate. The heat dissipation apparatus may be configured to provide passive cooling. The heat dissipation apparatus may comprise a heat sink thermally connected to the or each plate. The heat sink may comprise a body spaced apart from the plate and/or coils, for example mounted on the outside of the stator. Each body may have a plurality of fins extending therefrom to increase the rate of heat transfer to the surroundings. The electromotive machine may comprise a pair of such bodies, one mounted on either side of the stator. Additionally or alternatively, the heat dissipation apparatus may be configured to provide forced cooling. For example, the heat dissipation apparatus may comprise an air and/or liquid-cooling system. The air cooling system may comprise a flow generator configured to provide air flow over one or more bodies thermally connected to the or each plate (for example a heat sink). The liquid-cooling system may comprise a body (for example a heat sink) having one or more channels formed therein, said body being separate from and thermally connected to the or each plate. Said body may be configured for connection to a liquid supply. The liquid-cooling system may further comprise one or more flow generators configured to provide a flow of liquid from said supply through said channel(s). Providing such a heat dissipation apparatus may increase the rate at which heat is carried away from the machine. This may increase the current that may be supplied to the machine. The liquid-cooling system may suitable for use with water (i.e. be a water-cooling system) or other coolant.

The plurality of through slots formed in the plate may be of varying sizes, or they may all be the same size. Variations in the slot sizes may allow for different rates of cooling occurring in different parts of the machine.

The stator of the electromotive machine may further comprise thermally conductive resin that provides a thermal connection between components with which it is in contact. Such resins are available commercially, for example, from ELANTAS PDG, Inc. under the brand name Elan-Tron. The thermally conductive resin may be in contact with the coils and the at least one plate. The coils and plate(s) may be enclosed within such resin. Thermally conducting resin may be used to increase the contact between the heat producing windings in the machine and the heat dissipation components, facilitating better removal of heat. The thermally conductive resin may also act as a potting compound to protect components of the machine from, for example, moisture and corrosive agents.

The stator may further comprise one or more sheets comprising electrically insulative material (hereafter insulating sheets) such that components separated by such sheets are effectively electrically isolated from each other. The plate(s) and the coils may be separated by one or more insulating sheets. The insulating sheets may be in contact with, for example at least partially encased in, the thermally conductive resin (if present).

The stator may further comprise a mounting assembly configured to connect the stator to other apparatus.

The plate may be a metal plate, for example the plate may be an aluminium, copper and/or brass plate.

According to a second aspect of the invention, there is provided a coil for an electromotive machine, the coil comprising a plurality of turns of a conductor, said conductor having two ends for electrically connecting the coil, wherein each end is located on the outside of the coil (in a radial direction). Providing a coil with both ends on the outside may avoid the need to bring a conductor from the inside to the outside of the coil thereby increasing the thickness of the coil, this may be of particular use when the conductor is relatively thick.

Each coil may be a flat coil. That is to say, the thickness of the coil may be less than 20 mm, for example less than 15 mm, for example 12 mm.

A plurality of such coils may be connected together in a winding, for example a concentrated winding. There may be provided an electromotive machine comprising a plurality of such coils, for example mounted on the stator of the electromotive machine.

The coil may comprise at least one pair of sub-coils. A first sub-coil of each pair may be wound such that a first (outer) end is located closer to the outside (in radial terms, from the centre of the coil) of the sub-coil than a second (inner) end. The inner end of the first sub-coil may be joined to the inner end of a second sub-coil of the pair. In this arrangement the first sub-coil and the second sub-coil form a single conductive coil having two outer ends by which the first or second sub-coil can be joined to other first or second sub-coils.

Each coil may comprise further pairs of sub-coils. Each sub-coil may comprise a wound conductor. It will be appreciated that the terms inner end and outer end refer to the relative radial position of the ends. Thus, the inner end is located closer to, for example adjacent to, for example at, the centre of the sub-coil or coil than the outer end. The inner end may be located adjacent to, for example on, an inner edge of the sub-coil or coil. The outer end may be located in the region of, for example adjacent to, for example on, the outer edge of the sub-coil or coil. The first sub-coil may be arranged so that, in use, current flows from the outside towards the inside and the second sub-coil may be arranged so current flows from the inside towards the outside.

Alternatively, the coil may comprise a single conductor wound such that both ends are on the outside of the coil. A first portion of the conductor including a first end may be wound outward from a point located along the length of the conductor, for example a mid-region of the conductor, for example at or adjacent the centre of the conductor. A second portion of the conductor including a second end may be wound outwards from the same point. The conductor may be wound outwards from the centre in both directions.

The present invention provides, according to a third aspect, a method of operating an electromotive machine comprising a stator having a plurality of coils and a least one plate having a plurality of through slots formed therein facing said coils, the method comprising controlling the flow of current to said coils and wherein when a current is flowing through said coils the heat generated by said coils is absorbed, at least in part, by said plate. Thus, the coils may be cooled by means of heat flowing from the coils to the plate.

It may be that heat flows from the plate to a heat dissipation apparatus as described above.

The present invention may find application in a transportation system comprising a carriage configured to follow a predetermined path, for example configured to travel along a guide, for example a rail or track. The rotor may be mounted on the carriage. The stator may be located on the predetermined path, for example adjacent to and/or mounted on the guide, rail or track, such that the rotor and stator together form an electromotive machine when the carriage passes the location of the stator.

The present invention may find particular application in a transport system for use in the amusement industry. Thus, in a further aspect of the invention there is provided an amusement ride, for example a roller coaster, comprising an electromotive machine in accordance with any other aspect. The stator may be mounted adjacent to and/or on the framework supporting a car (a carriage) in which passengers are transported. The rotor may be mounted on the car.

Further application may be found in a transport system for use in freight handling and conveying. Thus, in a further aspect of the invention there is provided a freight handling system comprising an electromotive machine in accordance with any other aspect. It will be appreciated that the carriage of such a system is configured to transport the freight to be handled.

In a further aspect of the invention, an electromotive machine for a transportation system, for example for an amusement ride for example a roller coaster and/or a freight handling system may be provided.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
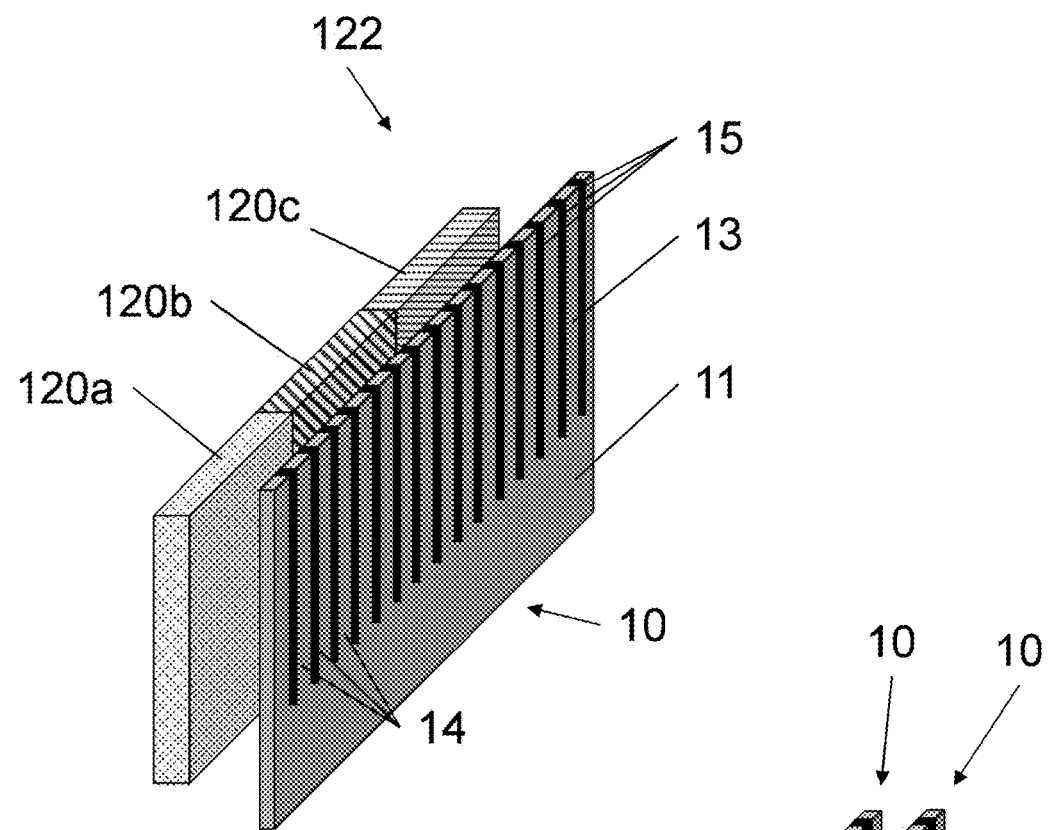
FIG. 1 shows a schematic view of a portion of a linear electromotive machine according to a first example embodiment of the invention.

FIG. 1 shows a schematic view of part of a single sided linear electromotive machine stator 122 according to a first embodiment of the invention. The stator comprises a flat heat dissipation plate 10 with a continuous lower section 11 and a discontinuous upper section 13. The discontinuous section comprises a plurality of parallel slots 15 extending from the top of the plate forming a plurality of long parallel protrusions 14, the slots 15 being formed completely through the plate 10 such that the protrusions 14 are connected at the ends joining them to the continuous section. The slots 15 and protrusions 14 extend along the length of the plate forming a comb like structure.

The stator 122 further comprises current conducting coils 120a, 120b, and 120c. In FIG. 1 the coils are represented by shaded blocks, but it will be appreciated that they comprise wound wire coils, for example as shown in more detail in FIGS. 10 and 11. The coils of FIG. 1 are flat coils positioned side by side in a coplanar arrangement along the length of the stator. Each coil is wound with a separate phase of a three phase AC supply (each phase being indicated by different shading in FIG. 1), where each phase is separated by 120° electrical degrees and the three phases are arranged in a repeating pattern, in a manner that is well known in the art. FIG. 1 shows a three phase machine with one coil of each phase but it is to be understood that the stator may be longer with windings formed of multiple coils.

Heat dissipation plate 10 is aligned along the length of the linear stator in a plane parallel to the coplanar coils 120a, 120b, 120c such that the inside faces of the coils face the plate. When the temperature of the coils 120 is higher than the temperature of the plate 10 heat will flow from the coils 120 into the plate 10 thereby reducing the temperature of the coils 120.

In use, inefficiencies in the electromagnetic winding coils 120a, 120b, 120c may cause the stator to heat up when conducting electrical currents due to their resistances. Running the motor at a higher operating point to generate more power output from moving components generally requires a higher current draw, and thus the motor may heat up more. When the motor heats to its temperature limit, beyond which the motor may become damaged or unsafe, it is not feasible to continue increasing the power output of the motor. Electromotive machines in accordance with the present embodiment may allow for an increase in the rate at which the heat generated by the motor is removed and thereby allow the motor to be safely operated at higher power outputs before it reaches its temperature limit.

Materials such as metals that are good thermal conductors are often also electrically conductive and may be susceptible to the formation of eddy currents. In some embodiments, heat dissipation plate 10 may be comprised of an electrically conductive material, for example, aluminium. The thin, discontinuous structure of heat dissipation plate 10 mitigates the formation of eddy currents by introducing separations into the continuous space that they require to circulate.

It will be appreciated that eddy currents caused by changing magnetic fields, such as for example those from time-varying AC electromagnets such as the windings of the machine, or from the relative motion of moving magnets in relation to stationary components can cause inefficiencies such as increasing the temperatures of components or by creating magnetic braking forces.

Figure 2:
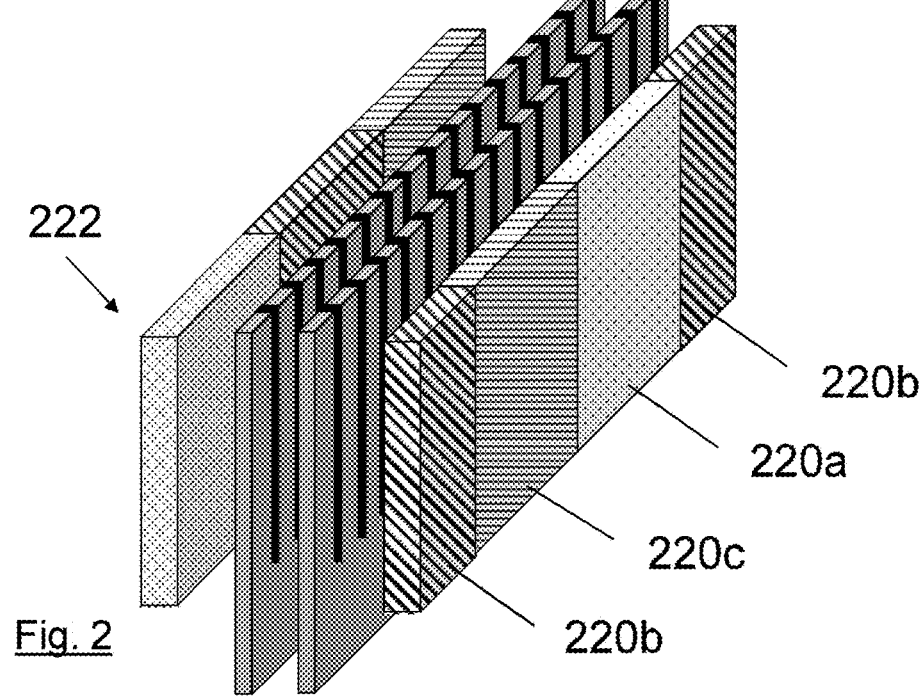
FIG. 2 shows a schematic view of a portion of a linear electromotive machine according to a second example embodiment of the invention.

FIG. 2 shows a schematic view of part of a two sided linear electromotive machine stator 222 according to a second embodiment of the invention. The machine 222 comprises two heat dissipation plates 10 and two sets of windings formed of electromagnetic coils 220a, 220b, 220c, with one set of windings on each side of the heat dissipation plates such that the heat dissipation plates are positioned along the centre of the stator 222 and the windings are arranged along the outside of the stator. The phases follow the same repeating pattern of the first embodiment. The winding coils along the outside of the stator are offset with respect to one another by a pitch of one and a half coils. In this arrangement each winding coil is half way between two coils of the corresponding phase on the opposite side of the rotor. This may allow the cancellation of an n-pole harmonic of the magnetic field, where n is a positive, even integer (as discussed in more detail in EP 2 027 691). It will be appreciated that other winding arrangements may be used.

The second embodiment may be considered as a two sided version of the first embodiment comprising a combination of two linear motors as described in the first embodiment offset in relation to one another.

Figure 3:
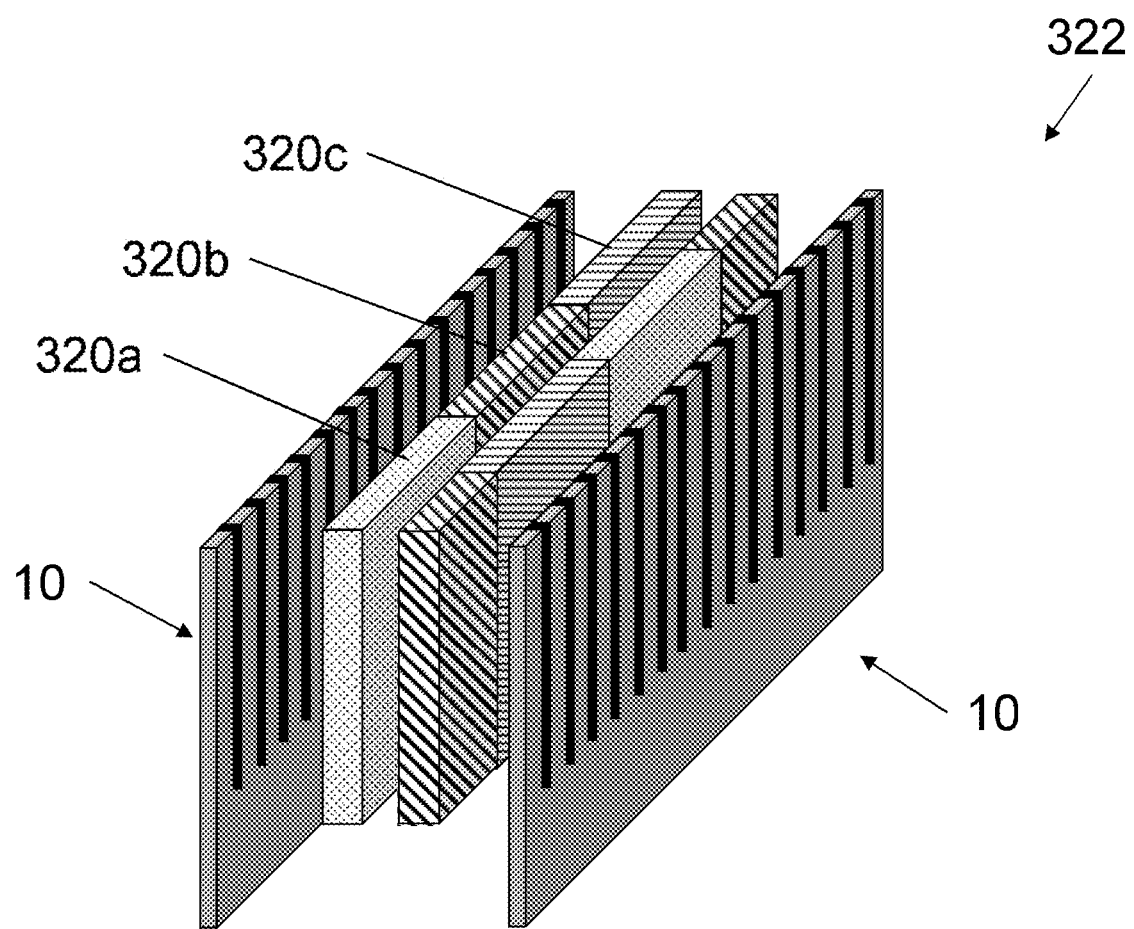
FIG. 3 shows a schematic view of a portion of a linear electromotive machine according to a third example embodiment of the invention.

FIG. 3 shows a schematic view of part of a two sided linear electromotive machine stator 322 according to a third embodiment of the invention. This embodiment is similar to the second embodiment but with the winding coils 320a, 320b, 320c arranged along the centre of the stator and the heat dissipation plates 10 arranged along the outside of the stator.

Figure 4:
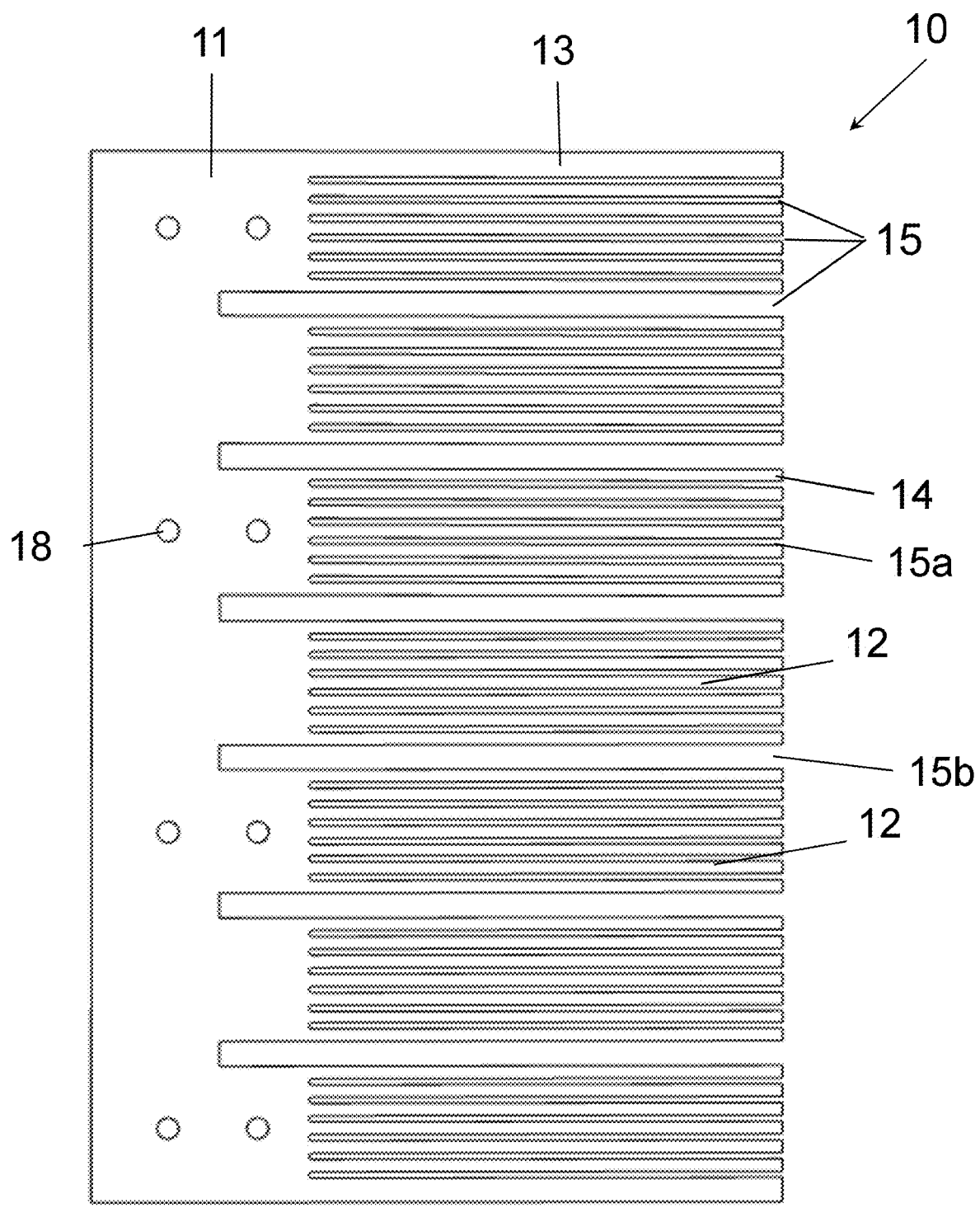
FIG. 4 shows a plate suitable for use with the first, second and third embodiments of the invention.

A heat dissipation plate 10 suitable for use in any of the first, second and third embodiments is shown in more detail in FIG. 4. The plate 10 has a series of perpendicular slots 15 extending from one edge across a portion of the width of the plate. The slots 15 define a series of parallel protrusions 14 perpendicular to the edge of the plate 10. The slots 15 are formed on the same edge of the plate 10 such that the protrusions 14 resemble a comb like shape. The plate comprises narrow slots 15a and wide slots 15b, forming a plurality of protrusions 14 grouped into sections of protrusions 12. The narrow slots 15a separate individual protrusions 14 from neighbouring protrusions in a section 12, and the wide slots 15b separate sections 12 of protrusions 14 from neighbouring sections 12. The slots 15a, 15b are straight with parallel sides and are parallel with each other. It is to be understood that other sizes and configurations of slots may be used to form other configurations of slots and slot sections. In other embodiments, the slots may be formed at an angle to the edge of the plate, may be angled with respect to one another and/or have non-parallel sides, for example the protrusions may be tapered.

The heat dissipation plate 10 has a continuous section 11 and a discontinuous section 13. The slots do not extend across the entirety of the width of the plate 10 and the continuous section 11 extends lengthwise along the plate adjacent to the slots 15 and protrusions 14. The continuous section 11 of the heat dissipation plate joins the sections of protrusions 12 together. The continuous section contains connection holes 18 through the plate arranged to receive connectors, for example bolts, for fixing together the heat dissipation plates 10, windings, and further components of the stator.

Embodiments of the invention thus far have been described in relation to a linear motor but it should be understood that the invention may equally be applied to electromotive machines of a different structure, such as rotary motors.

Figure 5A:
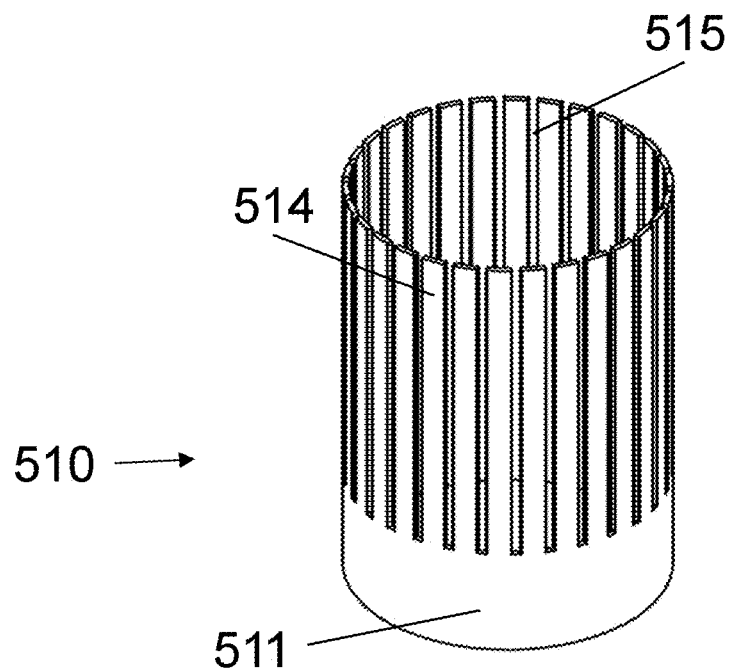
FIG. 5a shows a plate for use in a fourth example embodiment of the invention.
Figure 5B:
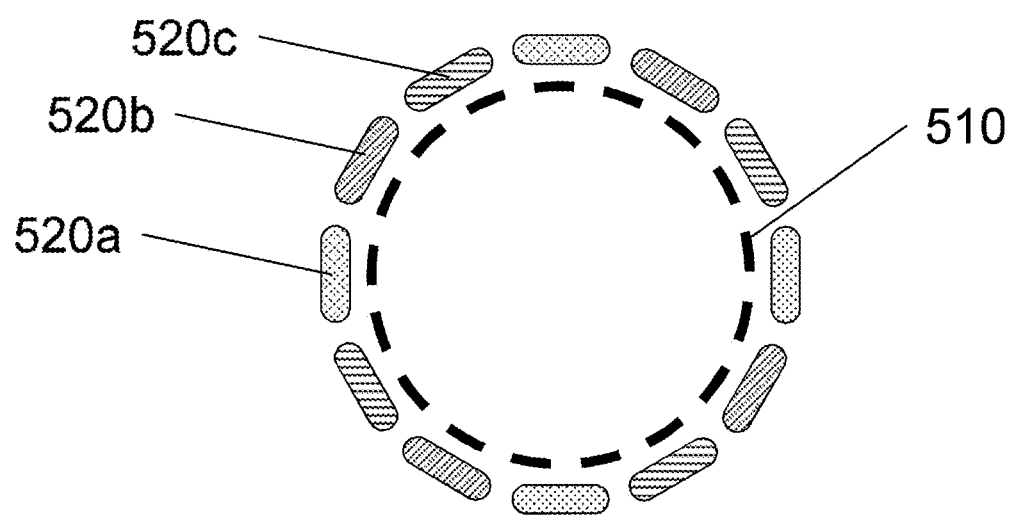
FIG. 5b shows a schematic view of a heat dissipation apparatus according to a fourth example embodiment of the invention.

FIG. 5a shows a schematic view of a plate 510 for use with a cylindrical rotary motor according to a fourth embodiment. Protrusions 514 are separated by slots 515, and connected at their 'bottom' ends (when viewed in the orientation of FIG. 5a) by continuous cylindrical section 511 of a cylindrical heat dissipation plate 510, in a similar manner to the previous embodiments. The 'top' ends (when viewed in the orientation of FIG. 5a) of the protrusions are unconnected. Thus in the fourth embodiment the heat dissipation plate of the previous embodiments is formed into a cylindrical body. The cylindrical heat dissipation plate 510 may have slots 515 of varying width, for example, narrow slots and wide slots. The cylindrical heat dissipation plate 510 is shown arranged with a series of coils 520a, 520b, 520c in FIG. 5b. The coils 520 are located around the outside of the circumference of the cylinder. The windings and heat dissipation plate are arranged in a concentric arrangement with the inside faces of the coils 520 facing the heat dissipation plate 510. In FIG. 5b four coils 520 of each phase are shown arranged outside one heat dissipation plate but it is to be understood that two or more heat cylindrical dissipation plates 510 may be used and any number of coils may be arranged either inside or outside the heat dissipation plate or plates.

Figure 6A:
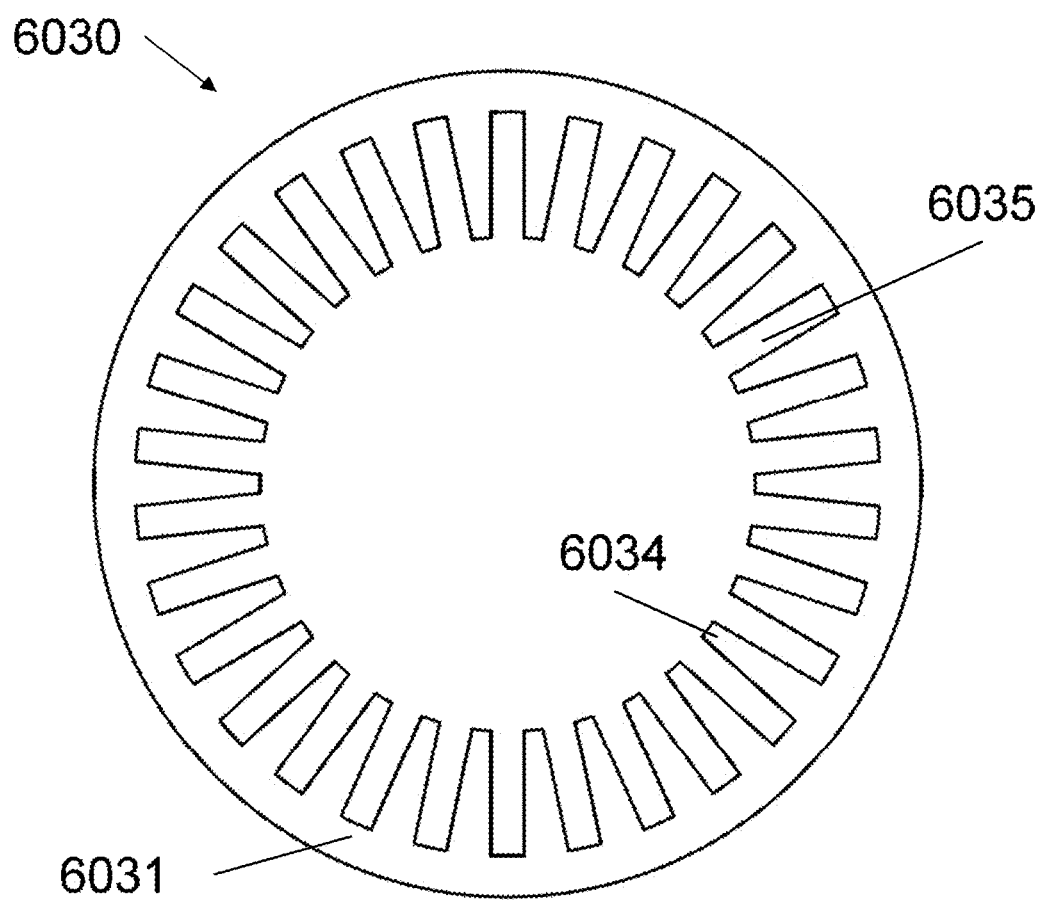
FIGS. 6 (a) to (d) show parts of linear electromotive machines according to a fifth example embodiment of the invention.

FIG. 6a shows a schematic view of an example of a plate suitable for use with a rotary disc motor according to a fifth embodiment. Heat dissipation disc 6030 comprises protrusions 6034 separated by slots 6035. The protrusions 6034 are connected around the outside edge by a continuous annular section 6031 of the disc-shaped heat dissipation plate 6030.

In a similar manner to previous embodiments, the inner ends of the protrusions are not connected. In this example, the slots 6035 are a continuous width with parallel sides and the protrusions 6034 are tapered.

Figure 6B:
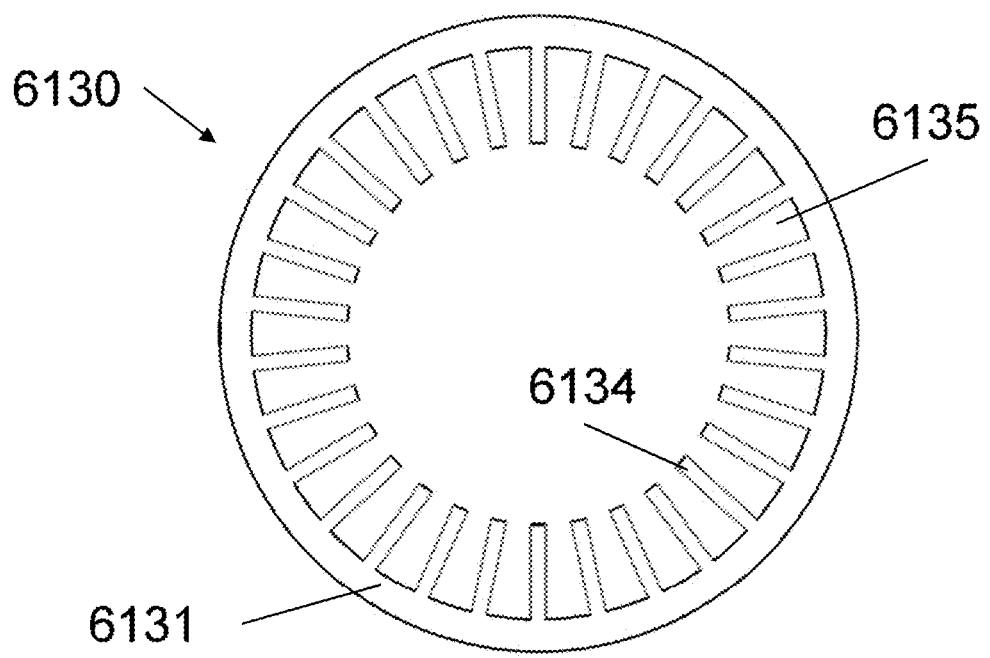

FIG. 6b shows a variation of the plate of FIG. 6a. Plate 6130 is disc shaped and suitable for use with a rotary disc motor. Protrusions 6134 are connected around the outside edge by a continuous annular section 6131 of the disc-shaped heat dissipation plate 6130. In this embodiment protrusions 6134 have parallel sides and are separated by slots 6135 which are therefore tapered.

Figure 6C:
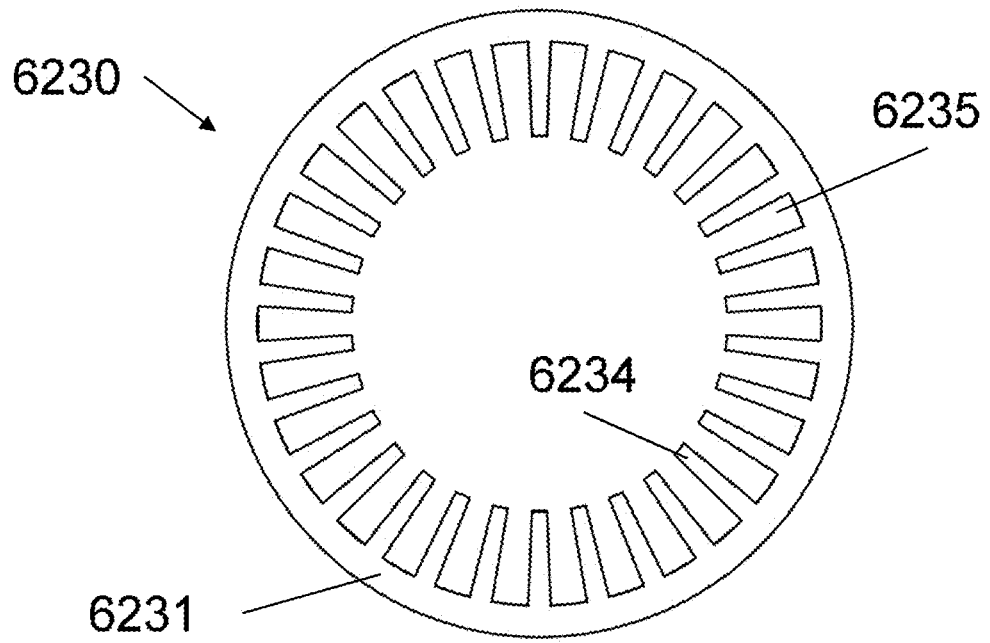

FIG. 6c shows another variation of the plate of FIG. 6b. Plate 6230 is disc shaped and suitable for use with a rotary disc motor. Protrusions 6234 are connected around the outside edge by a continuous annular section 6231 of the disc-shaped heat dissipation plate 6230. In this embodiment protrusions 6234 are separated by slots 6235 and both the protrusions 6234 and the slots 6235 are tapered.

Figure 6D:
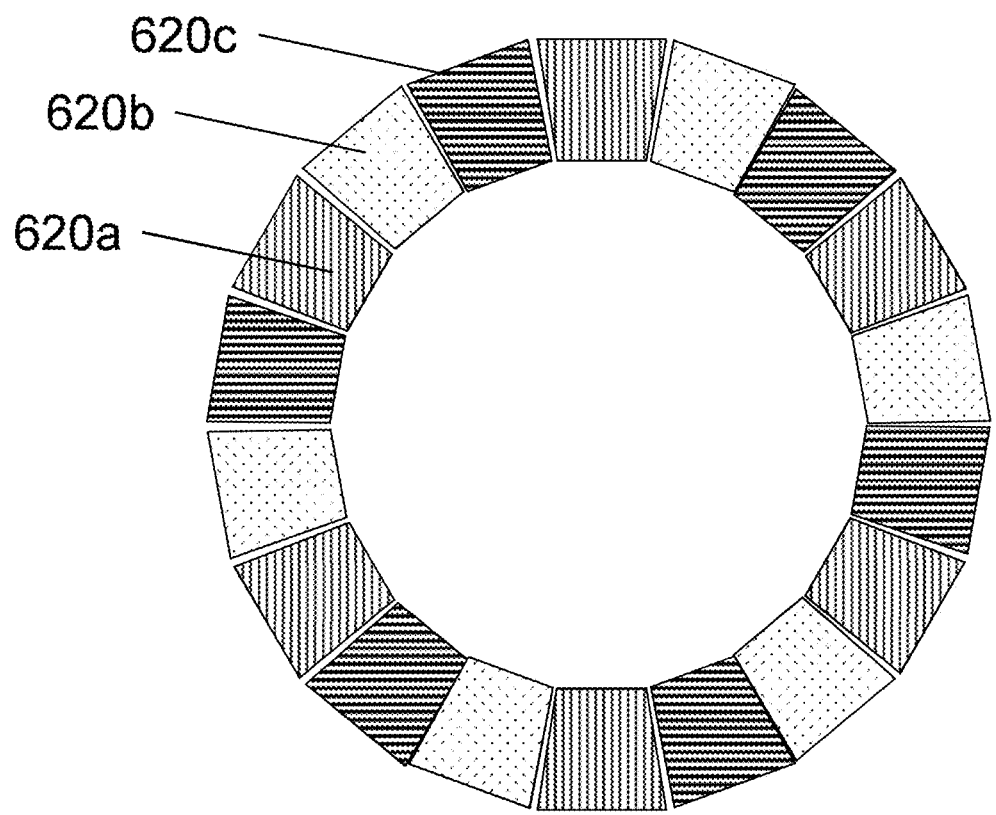

FIG. 6d shows an example of a winding arrangement comprising electromagnetic windings 620a, 620b, 620c arranged in a ring and suitable for use with the disc plate of any of FIGS. 6(a) to 6(c).

Figure 7:
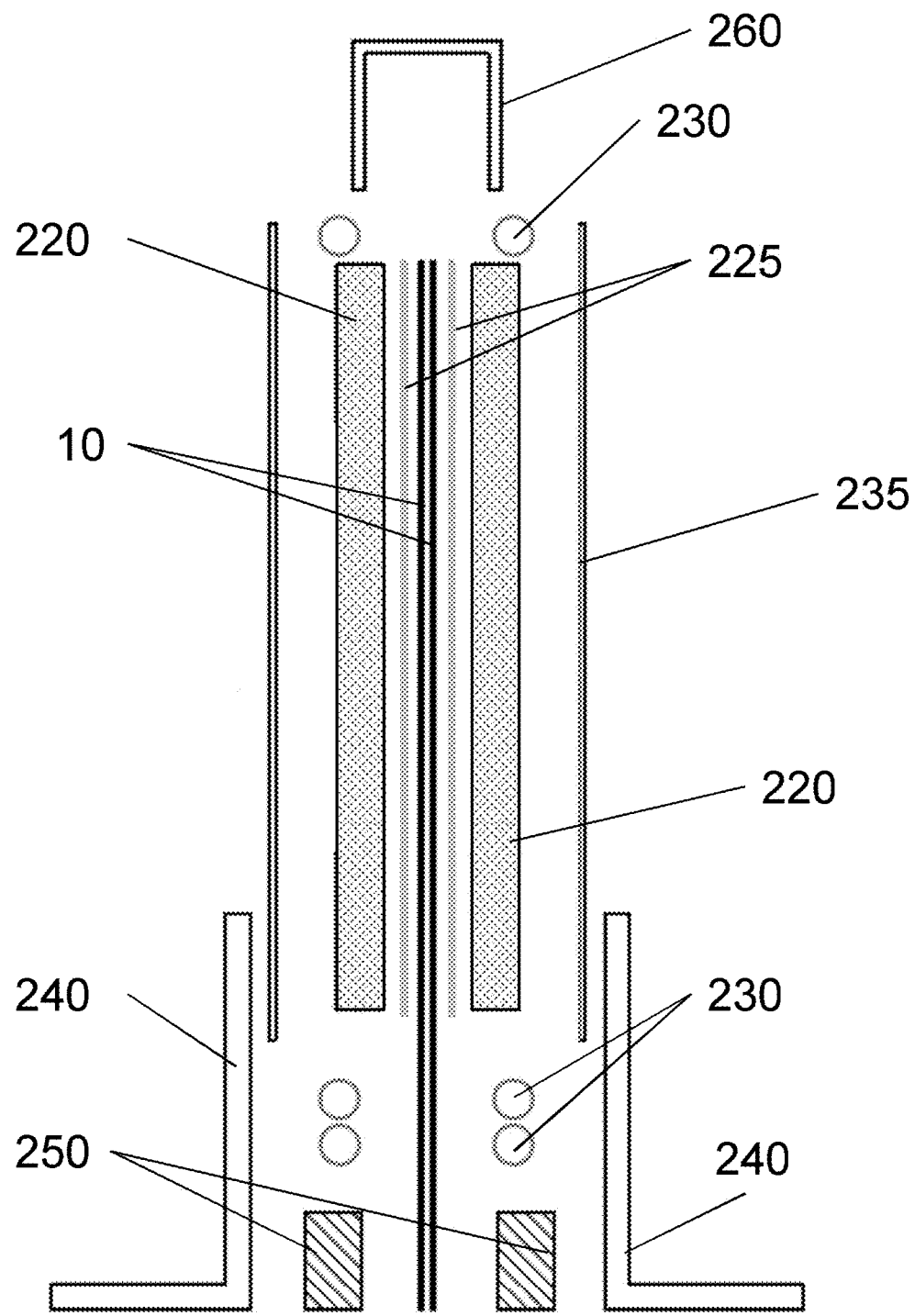
FIG. 7 shows an exploded view of a portion of an electromotive machine according to the second embodiment.

An exploded cross sectional view of a stator in accordance with the second example embodiment is shown in FIG. 7. The stator comprises two heat dissipation plates 10 arranged along the centre of the machine, between sets of coils 220 on a first and second side of the stator. A layer of electrical insulation 225 is positioned between the coils 220 and heat dissipation plates 10. Running along the upper and lower ends of the stator adjacent to the windings are leads 230 that supply current to the coils 220. Two parallel solid bars 250 are arranged along the bottom of the stator with one on either side of the pair of plates 10. When assembled, the bars 250 are next to the plates 10, such that they are thermally connected and, in use, the heat conducted away from the coils 220 by the plates 10 may flow into the bars 250. Outer walls 235 are arranged along the outsides of the coils 220 to contain the components of the stator and are comprised of electrically insulating material. The stator further comprises a structural 'U' shaped channel 260. The 'U' shaped channel 260 sits along the top of the stator with the outer walls 235, and other components, between the arms of the 'U'. The stator further comprise two 'L' shaped mounting brackets 240. One 'L' shaped mounting bracket 240 is fixed along either side of the base of the stator and may be in direct contact with the thermally conducting bars 250. The 'L' shaped mounting brackets 240 may be comprised of a thermally conducting material to further conduct heat away from the thermally conductive bars. The 'U' shaped channel 260 and 'L' shaped mounting brackets 240 may contain holes through which fixing apparatus such as screws or bolts may be inserted or may be fixed by other means. The mounting brackets 240 may be used to mount the stator to other apparatus.

Figure 8:
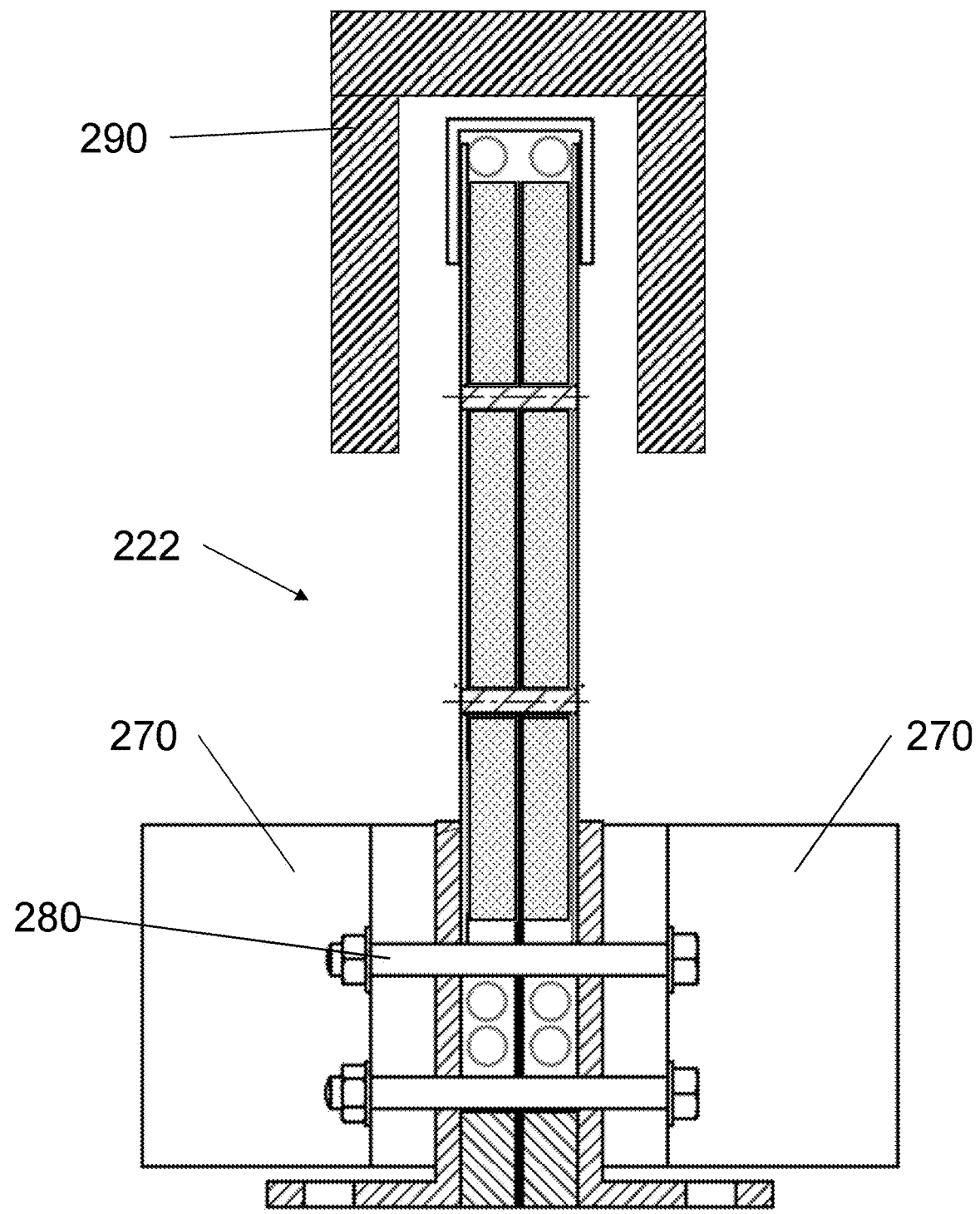
FIG. 8 shows an assembled view of an electromotive machine according to the second embodiment.

An end view of the machine of FIG. 7 is shown assembled in FIG. 8 with fixing apparatus 280 securing the 'L' shaped brackets around the other components of the stator. Also included in FIG. 8 are two externally mounted heat sinks 270 which are thermally connected to the 'L' shaped brackets 240. The heat sinks 270 provide a means for the heat from the stator to be dissipated to the surroundings of the stator. In some embodiments the heat sinks may include fins arranged to increase the surface area, and thereby cooling rate, of the heat sinks. A u-shaped rotor 290 straddles the top edge of the stator 222.

Figure 9:
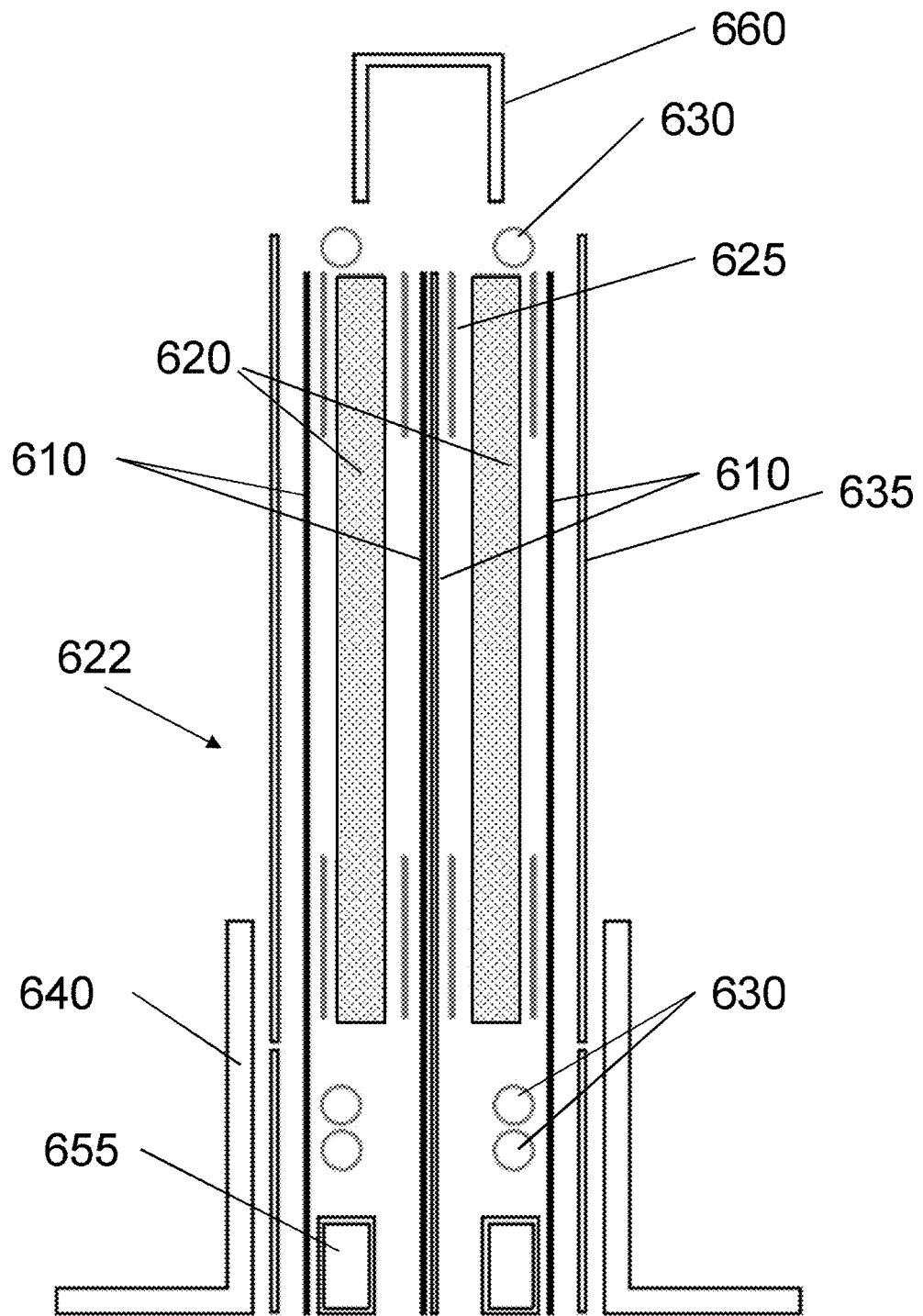
FIG. 9 shows an exploded view of an electromotive machine according to a sixth example embodiment of the invention.

A sixth embodiment of the invention with four heat dissipation plates 610 is shown in FIG. 9. In this embodiment, there are two heat dissipation plates 610 running along the centre of the stator 622, as in the second embodiment, and two further heat dissipation plates 620 positioned on the outsides of the coils 620.

FIG. 9 also shows an alternative to the thermally conducting bars 250 shown in FIGS. 6 to 8. Like FIG. 7, a layer of electrical insulation 625 is positioned between the coils 620 and heat dissipation plates 610. Running along the upper and lower ends of the stator adjacent to the windings are leads 630 that supply current to the coils 620. Two parallel solid bars 650 are arranged along the bottom of the stator with one on either side of the pair of plates 610. When assembled, the bars 650 are next to the plates 610, such that they are thermally connected and, in use, the heat conducted away from the coils 620 by the plates 610 may flow into the bars 650. Outer walls 635 are arranged along the outsides of the coils 620 to contain the components of the stator and are comprised of electrically insulating material. The stator further comprises a structural 'U' shaped channel 660. The 'U' shaped channel 660 sits along the top of the stator with the outer walls 635, and other components, between the arms of the 'U'. The stator further comprise two 'L' shaped mounting brackets 640. One 'L' shaped mounting bracket 640 is fixed along either side of the base of the stator and may be in direct contact with the thermally conducting bars 650. The 'L' shaped mounting brackets 640 may be comprised of a thermally conducting material to further conduct heat away from the thermally conductive bars. The 'U' shaped channel 660 and 'L' shaped mounting brackets 640 may contain holes through which fixing apparatus such as screws or bolts may be inserted or may be fixed by other means. The mounting brackets 640 may be used to mount the stator to other apparatus. In FIG. 9 the thermally conducting bars are replaced with hollow fluid carrying channels 655 through which a cooling liquid, for example water, may flow. The channels 655 extend along the bottom edge of the stator 622, between the lower ends of the plates 610 in FIG. 9. The flow of cooling fluid increases the rate at which heat may be transferred away from the stator.

While FIG. 9 shows heat dissipation plates both inside and outside the windings in combination with externally mounted heat sinks it is to be understood that this is for illustrative purposes only and the two features are not linked.

Figure 11:
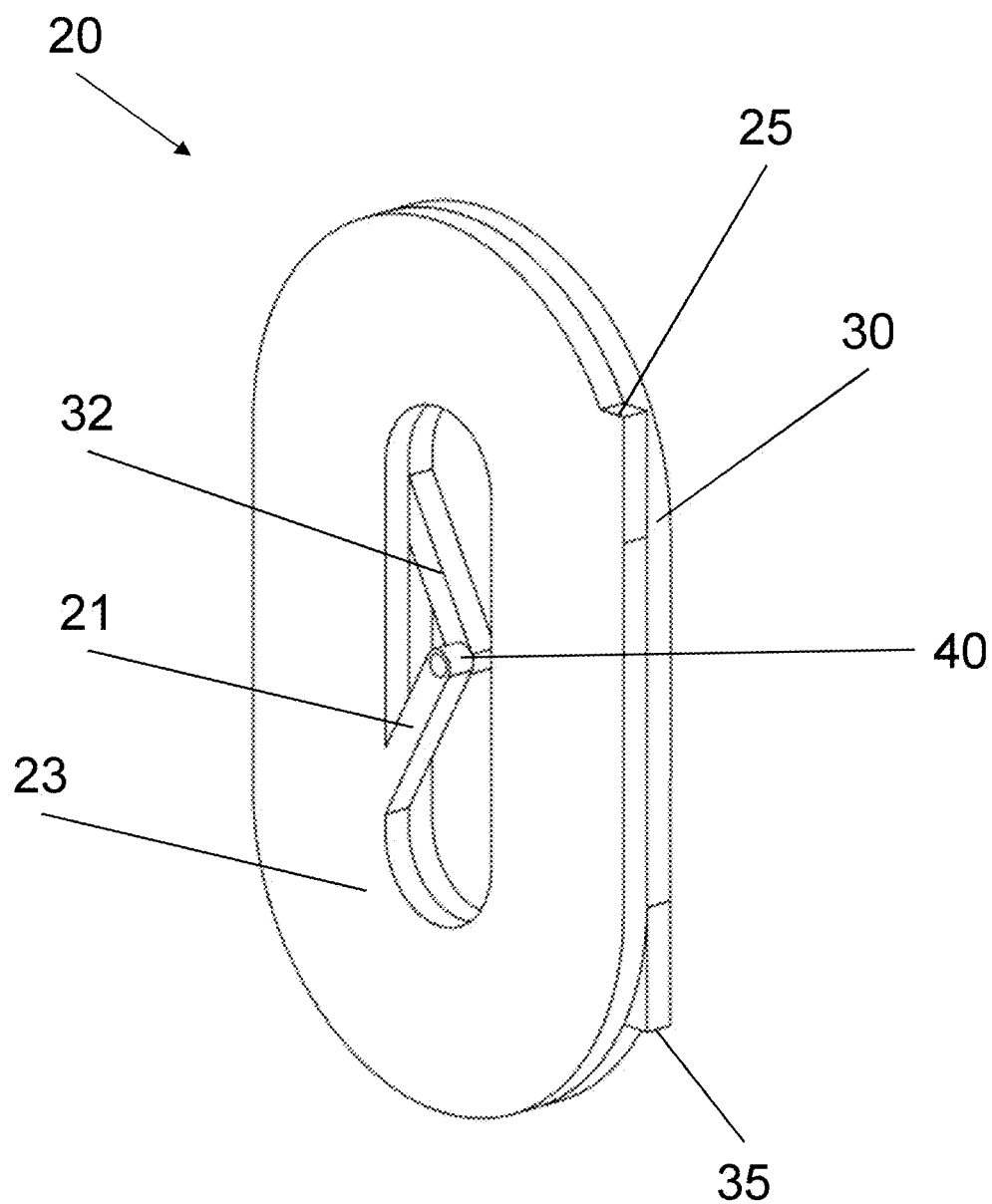
FIG. 11 shows a winding coil suitable for use with embodiments of the invention.

FIG. 11 shows a close up of a single coil 20 suitable for use with the machine of any previous embodiment. Coil 20 comprises a front half-coil 23 mounted adjacent to and parallel with a rear half-coil 30. A front inner coil connecting leg 21 in the centre of the front half-coil 23 connects at a connection point 40 to the back inner coil connecting leg 32 located at the centre of the rear half-coil 30. A front connection point 25 is located on the outside of front half-coil 23 and a rear connection point 35 is located on the outside of rear half-coil 30. In use, coil 20 is connected to the supply, or to other coils of the same phase winding, via the connection points 25, 35. While the coil of FIG. 11 is comprised of two separate coils of wire that are wound toward their centres and joined together, it will be apparent to the skilled person that a single length of wire may be used by, for example, supporting a centre portion of the wire and winding the two sides in outwards (e.g. in both directions) such that no middle join is present in the resulting coil.

Figure 12:
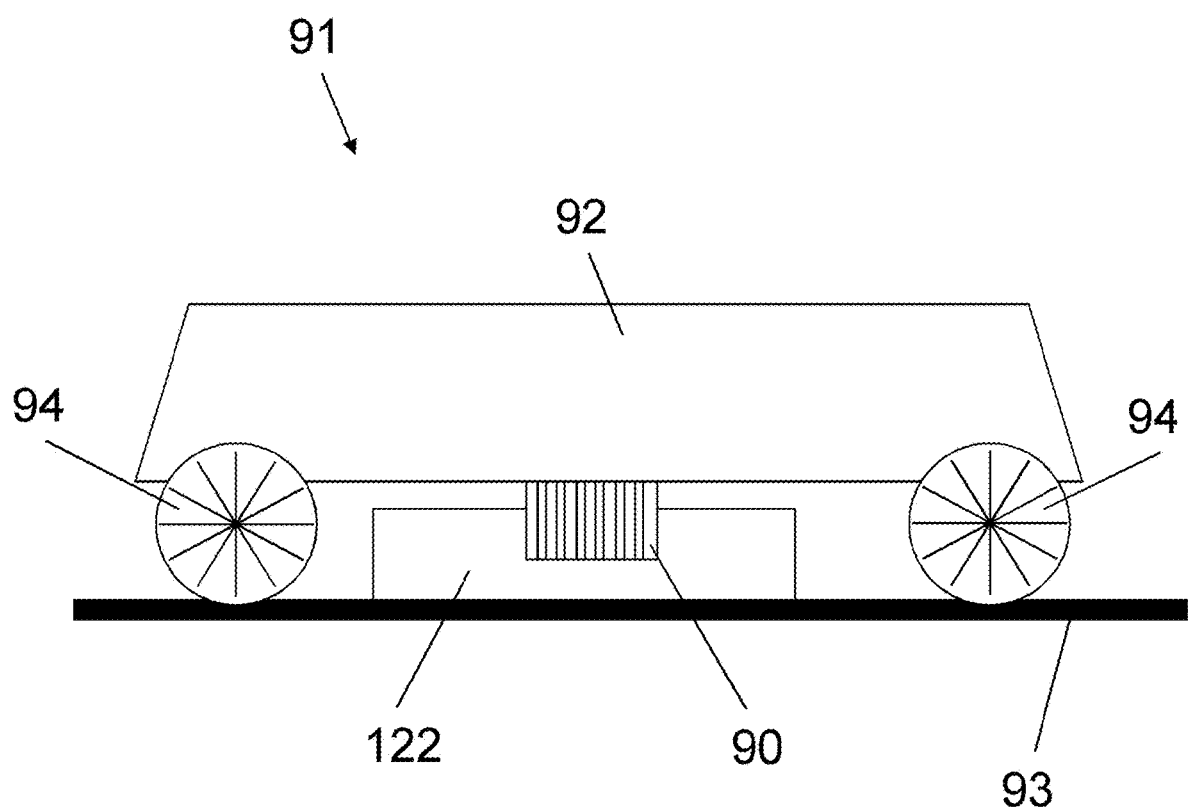
FIG. 12 shows a transportation system including an electromotive machine in accordance with the first, second and/or third embodiments.

A transportation system 91 comprising a linear electromotive machine according to any of the first, second and/or third embodiments is shown in FIG. 12. The transportation system comprises moveable carriage 92 and stationary guiding track 93. The movable carriage 92 comprises rollers 94, and a rotor 90. A stator 122 in accordance with previous example embodiments is mounted on the track 93. The rotor 90 and the stator 122 combine to form an electromotive machine as described above. The rotor 90 is affixed to the carriage 92. In use, the rollers 94 of the carriage 92 travel along the track 93. When the stator 122 is energised the interaction of the moving magnetic field of the stator 122 and moving magnetic field of the rotor 90 combine to produce a thrusting force that moves the carriage 92 along the stationary guiding track 93.

In the transportation system of FIG. 12 the rollers 94 are mounted to the movable carriage 92, however they may equally be attached to the stationary guiding track such that the carriage rolls over the rollers. In other embodiments, the rollers and/or track may be absent and other forms of guide may be used.

In some embodiments the transportation system 91 is a roller coaster. In other embodiments the transportation system is a freight or baggage handling system. In further embodiments the transportation system is a public transport system. In further embodiments the transportation system is a vehicle launching system.

Where coils are desired to be substantially flat with a relatively thick single-layered conductor it can present a challenge to bring the conductor from the centre of the coil to the outside of the coil for connection to the electrical supply and other coils of the same phase without increasing the overall thickness of the coil by overlapping the conductor back over the coil. This problem may be overcome by the use of sub-coils as described above.

Figure 10A:
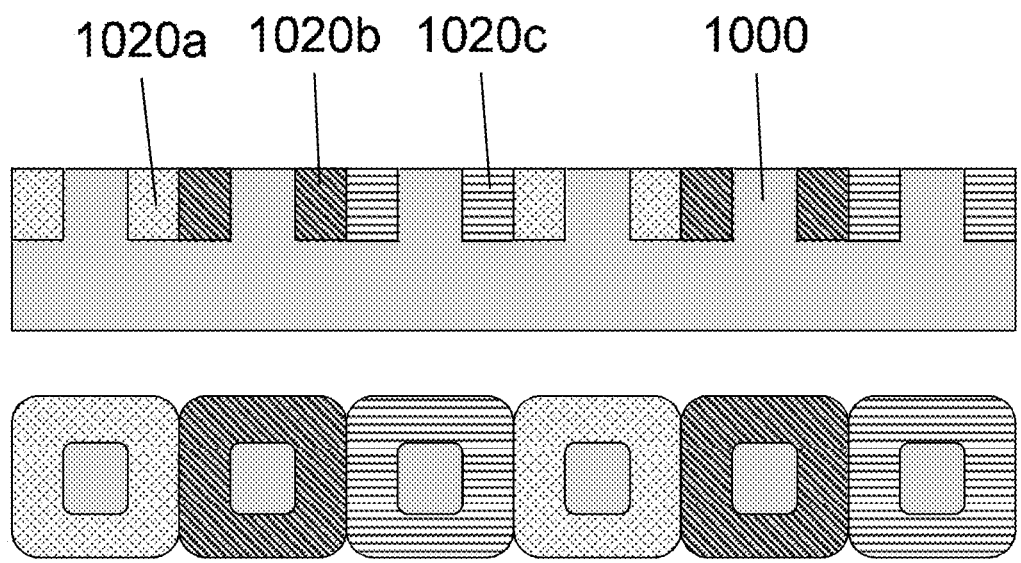
FIG. 10 shows (a) solid cored windings and (b) air cored windings suitable for use with embodiments of the invention.
Figure 10B:
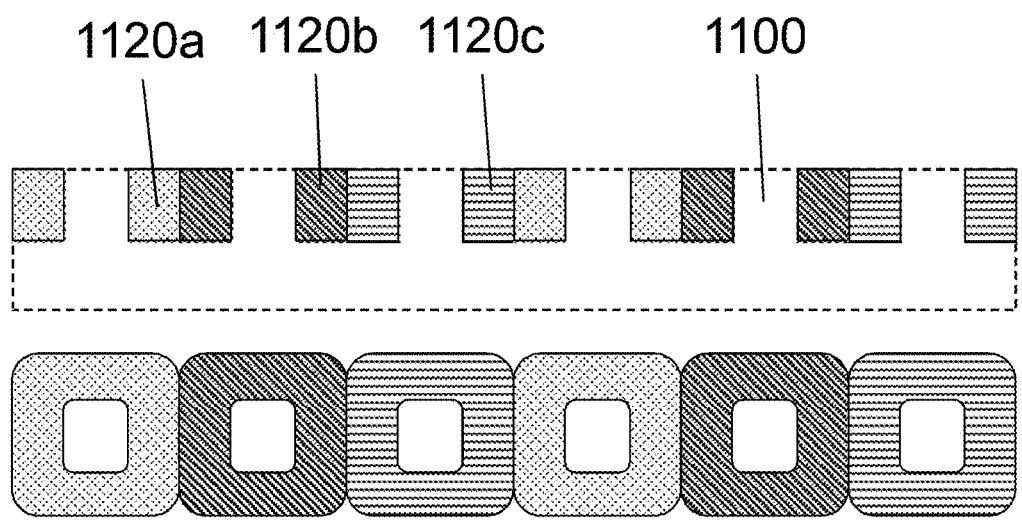

Arrangements of concentrated windings suitable for use with an electromotive machine according to any previous embodiment are shown in FIGS. 10a and 10b. In FIGS. 10a and 10b two coils 1020 of each phase winding are shown on a single sided stator. FIGS. 10a and 10b each provide a longitudinal cross sectional view of the stator and a top-down view of the stator. The coils comprise insulated conductive wire wound around a core, forming closed loops. The concentrated coils are each positioned adjacent to neighbouring coils in a coplanar arrangement and do not overlap. FIG. 10a shows coils 1020a, 1020b, 1020c arranged on a solid ferromagnetic core 1000 suitable for use with electromotive machines according to the present invention. FIG. 10b shows air cored coils 1120a, 1120b, 1120c, i.e. coils arranged on a non-ferromagnetic material core 1110 (denoted by a dashed line in FIG. 10b), for example air or resin, also suitable for use with electromotive machines according to the present invention.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Possible variations of the invention may utilise more or fewer heat dissipation plates that those described in the embodiments. For example an electromotive machine similar to the first embodiment may comprise two or more parallel heat dissipation plates affixed to the same side of the stator, or to both sides of the stator. Similarly, an electromotive machine similar to the second and third embodiments may comprise heat dissipation plates both inside and outside the two sets of coils.

Heat dissipation plates are shown in the figures as being as large or larger than the windings they face, but it should be understood that the heat dissipation plates may be smaller than the windings they face.

The skilled person will understand that while embodiments of the invention have been described that comprise single layer, single coil concentrated windings that other arrangements of windings could be used, including concentric windings, distributed windings, windings with multiple layers, and other arrangements of windings.

While the use of external heat sinks and liquid cooling methods have been described in specific arrangements it should be understood that they could be arranged differently and it will also be apparent that other forms of passive and forced cooling could equally be used.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An electromotive machine having a stator comprising a plurality of coils and a plate, wherein the machine is a linear electromotive machine, said plate extending in a plane parallel to the plane of the coils, wherein a portion of the plate faces a corresponding coil such that a surface of said portion of the plate is substantially perpendicular to the direction of the magnetic axis of the coil produced when the coil is in an energized state and said plate is located relative to the coil such that, in use, heat from the coil flows into said portion; and wherein the plate has a plurality of through slots formed therein and the slots extend from an edge of the plate across the majority of the width of said surface of the plate without reaching another edge of the plate.

2. An electromotive machine as claimed in claim 1 wherein the coils are air cored.

3. An electromotive machine as claimed in claim 1 wherein the stator comprises windings, the windings comprising a first set of coils on a first side of the stator and a second set of coils on a second side of the stator.

4. An electromotive machine as claimed in claim 3, wherein the stator comprises a second plate with a plurality of through slots formed therein and at least a portion of said second plate faces a corresponding coil and is located relative to the coil such that, in use, heat from the coil flows into the second plate and one of the plates faces the coils of the first set and the other of the plates faces the coils of the second set.

5. An electromotive machine as claimed in claim 4 wherein the plates are located between the first and second sets of coils or wherein the coils of the first and second sets are located between the plates.

6. An electromotive machine as claimed in claim 3, wherein the coils of the first set are in a displaced position relative to the coils of the second set so that corresponding coils of each set are not aligned and an n-pole harmonic of the magnetic field is substantially cancelled, where n is a positive, even integer.

7. An electromotive machine as claimed in claim 1 wherein the plate is rectangular.

8. An electromotive machine as claimed in claim 1 wherein the coils form concentrated windings.

9. An electromotive machine as claimed in claim 1, wherein the electromotive machine is an AC machine.

10. An electromotive machine as claimed in claim 9, wherein the electromotive machine is a polyphase machine.

11. An electromotive machine as claimed in claim 10, wherein the electromotive machine is a three-phase machine.

12. An electromotive machine as claimed in claim 1 wherein the plate is thermally connected to a heat sink.

13. An electromotive machine as claimed in claim 12, comprising a forced cooling system thermally connected to the plate.

14. An electromotive machine as claimed in claim 13, wherein the forced cooling system is an air cooling system.

15. An electromotive machine as claimed in claim 14, wherein the forced cooling system is thermally connected to the plate via the heat sink.

16. An electromotive machine as claimed in claim 13, wherein the forced cooling system is a liquid cooling system.

17. An electromotive machine as claimed in claim 1 wherein the coils and the plate are encased in thermally conductive resin.

18. A transportation system comprising a carriage configured to travel along a predetermined path and an electromotive machine according to claim 1, the electromotive machine further comprising a rotor mounted on the carriage, the stator being mounted on and/or adjacent to the predetermined path.

19. An electromotive machine as claimed in claim 1, wherein the plate has a volume and the majority of the volume of the plate is solid.

20. A method of operating a linear electromotive machine comprising a stator having a plurality of coils and at least one plate, said plate extending in a plane parallel to the plane of the coils and facing said coils, a surface of said portion of the plate being substantially perpendicular to the direction of the magnetic axis of the coil produced when the coil is in an energized state the method comprising controlling the flow of current to said coils and wherein when a current is flowing through said coils the heat generated by said coils is absorbed, at least in part, by said plate, and wherein the plate has a plurality of through slots formed therein and the slots extend from an edge of the plate across the majority of the width of said surface of the plate without reaching another edge of the plate.

* * * * *